(12) United States Patent
Vedula et al.

(10) Patent No.: US 7,797,403 B2
(45) Date of Patent: Sep. 14, 2010

(54) DEPLOYMENT OF CONFIGURATION INFORMATION

(75) Inventors: Nagender Vedula, Bothell, WA (US); Anand C. Ramanathan, Bellevue, WA (US); Valentino C. Baltazar, Kent, WA (US); Dharma Shukla, Sammamish, WA (US); Muralidhara Varma Chiluvuri, Sammamish, WA (US); Mario Pipkin, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 1166 days.

(21) Appl. No.: 10/193,891

(22) Filed: Jul. 12, 2002

(65) Prior Publication Data

US 2004/0010429 A1    Jan. 15, 2004

(51) Int. Cl.
*G06F 15/177*    (2006.01)
*G06F 15/16*    (2006.01)
*G06F 9/44*    (2006.01)

(52) U.S. Cl. .................. 709/220; 709/201; 717/168
(58) Field of Classification Search ......... 709/220–222, 709/224, 225, 223, 246, 201; 705/7; 717/100, 717/168
See application file for complete search history.

(56) References Cited

U.S. PATENT DOCUMENTS

| | | | | |
|---|---|---|---|---|
| 5,535,035 | A * | 7/1996 | DeFoster et al. ............ | 398/3 |
| 5,621,797 | A | 4/1997 | Rosen | |
| 5,787,114 | A * | 7/1998 | Ramamurthy et al. ....... | 375/221 |
| 5,812,824 | A * | 9/1998 | Dearth et al. ............... | 703/14 |
| 5,860,007 | A * | 1/1999 | Soni et al. .................. | 717/121 |
| 5,875,293 | A * | 2/1999 | Bell et al. ................... | 714/27 |
| 5,974,046 | A * | 10/1999 | Kim et al. .................. | 370/241.1 |
| 6,029,175 | A * | 2/2000 | Chow et al. ................ | 707/104.1 |
| 6,038,219 | A * | 3/2000 | Mawhinney et al. ........ | 370/242 |
| 6,173,420 | B1 * | 1/2001 | Sunkara et al. ............. | 714/38 |
| 6,176,883 | B1 * | 1/2001 | Holloway et al. ........... | 709/223 |

(Continued)

FOREIGN PATENT DOCUMENTS

JP    2002-82845    3/2002

(Continued)

OTHER PUBLICATIONS

Bauer, Hardware/Software co-simulation test bench, published 1997, obtained from the Internet at: http://ieeexplore.ieee.org/iel3/4655/13048/00597249.pdf.*

(Continued)

*Primary Examiner*—Kamal B Divecha
(74) *Attorney, Agent, or Firm*—Woodcock Washburn LLP

(57) ABSTRACT

A system and methods providing the automated configuration management and configuration information communication/deployment for a business process server computing application operating in a distributed computing environment is provided. In an illustrative implementation, a configuration management and configuration information communication/deployment tool operating in a distributed computing environment allows cooperating parties cooperating to operate a business process server computing application to more easily and efficiently update the configuration information of one or components of the business process server computing application responsive to changes in business practice changes between the cooperating parties. In the contemplated implementation, packages are requested by the cooperating parties using the configuration tool. The packages contain information indicative of desired business practice changes and the information required to reconfigure the business application to accommodate such changes. The tool allows for closed loop and real-time testing of the configuration changes.

10 Claims, 5 Drawing Sheets

U.S. PATENT DOCUMENTS

| | | | |
|---|---|---|---|
| 6,246,873 B1* | 6/2001 | Flowers et al. | 455/416 |
| 6,252,884 B1* | 6/2001 | Hunter | 370/443 |
| 6,338,086 B1* | 1/2002 | Curtis et al. | 709/218 |
| 6,341,287 B1* | 1/2002 | Sziklai et al. | 707/102 |
| 6,567,850 B1* | 5/2003 | Freishtat et al. | 709/224 |
| 6,625,648 B1* | 9/2003 | Schwaller et al. | 709/224 |
| 6,629,135 B1* | 9/2003 | Ross et al. | 709/218 |
| 6,675,178 B1* | 1/2004 | Chinchar et al. | 707/201 |
| 6,684,191 B1* | 1/2004 | Barnard et al. | 705/7 |
| 6,697,824 B1* | 2/2004 | Bowman-Amuah | 709/229 |
| 6,725,260 B1* | 4/2004 | Philyaw | 709/220 |
| 6,865,268 B1* | 3/2005 | Matthews et al. | 379/265.09 |
| 6,868,454 B1* | 3/2005 | Kubota et al. | 709/237 |
| 6,876,980 B2* | 4/2005 | Reid et al. | 705/28 |
| 6,877,093 B1* | 4/2005 | Desai et al. | 713/156 |
| 6,920,502 B2* | 7/2005 | Araujo et al. | 709/229 |
| 6,928,487 B2* | 8/2005 | Eggebraaten et al. | 709/246 |
| 6,930,984 B1* | 8/2005 | Nomura et al. | 370/254 |
| 6,993,506 B2* | 1/2006 | Jain et al. | 705/39 |
| 7,023,905 B2* | 4/2006 | Farine et al. | 375/150 |
| 7,024,450 B1* | 4/2006 | Deo et al. | 709/203 |
| 7,065,746 B2* | 6/2006 | Szabo et al. | 717/121 |
| 7,085,703 B2* | 8/2006 | Gabele et al. | 703/17 |
| 7,092,868 B2* | 8/2006 | Gabele et al. | 703/22 |
| 7,222,333 B1* | 5/2007 | Mor et al. | 717/115 |
| 2001/0003824 A1* | 6/2001 | Schnier | 709/203 |
| 2001/0037368 A1* | 11/2001 | Huang | 709/204 |
| 2001/0042094 A1 | 11/2001 | Mitchell et al. | 709/203 |
| 2001/0047406 A1* | 11/2001 | Araujo et al. | 709/223 |
| 2002/0038255 A1* | 3/2002 | Tarvydas et al. | 705/26 |
| 2002/0052932 A1 | 5/2002 | Curtis et al. | 709/218 |
| 2002/0052947 A1* | 5/2002 | Duimovich et al. | 709/224 |
| 2002/0083213 A1* | 6/2002 | Oberstein et al. | 709/313 |
| 2002/0087668 A1* | 7/2002 | San Martin et al. | 709/221 |
| 2002/0099837 A1* | 7/2002 | Oe et al. | 709/229 |
| 2002/0103900 A1* | 8/2002 | Cornelius et al. | 709/224 |
| 2002/0124081 A1* | 9/2002 | Primm et al. | 709/224 |
| 2002/0128946 A1* | 9/2002 | Chehade et al. | 705/37 |
| 2003/0074310 A1* | 4/2003 | Grovit et al. | 705/39 |
| 2003/0126050 A1* | 7/2003 | Theiss et al. | 705/35 |
| 2004/0267971 A1* | 12/2004 | Seshadri | 710/8 |

FOREIGN PATENT DOCUMENTS

| | | |
|---|---|---|
| JP | 2002-517858 | 6/2002 |
| RU | 2136042 | 8/1999 |
| RU | 2169437 | 6/2001 |
| WO | 01/18691 | 3/2001 |
| WO | WO 01/63837 | 8/2001 |
| WO | WO 01/63931 | 8/2001 |

OTHER PUBLICATIONS

Cardoso, J. et al., "Workflow Quality of Service", *Technical report. LSDIS Lab, Computer Science, University of Georgia*, Athens GA USA, Mar. 2002, 1-13.

Cardoso, J. et al., "Workflow Management Systems vs. ERP Systems: Differences, Commonalities, and Applications", *LSDIS Lab, Computer Science Department, University of Georgia*, Athens, Ga, USA, 30602; *MIS Department, Terry College of Business, University of Georgia*, Athens, GA, USA, 30602,1-22.

Helbig, T. "Development and Control of Distributed Multimedia Applications", *Proceedings of the 4th Open Workshop on High-Speed Networks*, Brest(France), Sep. 7-9, 1994, 6 pages.

Sheth, A. et al., "QoS for Service-oriented Middleware", *Web Services and Grid Computing, Proceedings of the Conference on Systemics, Cybernetics and Informatics*, Orlando, Fl., Jul. 2002,8 pages.

Sheth, A. et al., "Research in Multi-Organizational Processes and Semantic Information Brokering at the LSDIS Lab", *Large Scale Distributed Information Systems (LSDIS) Lab Department of Computer Science- The University of Georgia*, Athens, Ga 30602-7404 USA, 1-6.

That's How We Use XML; Part 3: Itochu Corporation Full-Adopts XML for SCM Made for Automobile Industry; Monthly Solution IT, RIC Telecom Corp., vol. 13, No. 5, pp. 27-30 (Japan Technical Magazine 2001-00235-004). May 1, 2001.

Koaru Kura, Kohichi Kitayama' XML Case Study: The Right Way to Deal with XML Depending on Purpose,'XML Magazine, Shoeisha, Co., Ltd., vol. 10, No. 3, pp. 77-87 (Japan Technical Magazine 2000-01042-007); Jul. 1, 2000.

"NEC "EDIAI Server" Examples of Frontline Users: Hewlett-Packard Japan, Ltd", Nikkei NetBusiness, Nikkei Business Publications, Inc., Sep. 15, 2000, 63, 88-89.

English Translation of: "NEC "EDIAI Server" Examples of Frontline Users: Hewlett-Packard Japan, Ltd", Nikkei NetBusiness, Nikkei Business Publications, Inc., Sep. 15, 2000, 63, 88-89.

\* cited by examiner

DEPLOYMENT OF CONFIGURATION INFORMATION

FIELD OF THE INVENTION

This invention relates in general to the field of information deployment and configuration between cooperating parties. More particularly, this invention relates to the automated super effective and efficient deployment (SEED) of information and configuration variables between cooperating parties.

BACKGROUND OF THE INVENTION

To succeed in the modern, competitive business environment, companies are working to maximize efficiency and decrease resource expenditure. Companies have adopted and implemented various technologies to increase operational efficiency. The use of technology can often make the difference between success and failure in the ultra-competitive business environment. From mobile telephones to fully integrated mobile personal digital assistants (PDAs) the business world is keen to adopt and incorporate new technologies to better serve their clients and to realize a competitive edge over market competitors. Most often clients/partners provide the incentive to the corporate world to evaluate, adopt, and implement technologies. As clients/partners become more technologically aware, so too must the companies servicing them. Hallmark evidence of the impact of technology on the corporate world is simply found by looking at the numerous electronic mail computing applications that exist today. It is difficult to think of a time when the corporate world did not rely on e-mail as a primary mode of communication.

The infrastructure that allows for the communication of electronic mail, also serves a basis for other intra-enterprise and inter-enterprise applications that allow for information and knowledge sharing. The infrastructure described is networked computing environments. With the proliferation of computer networks, a plethora of computing applications allowing for knowledge sharing and the communication of information have been developed. From project management computing applications, to data storage document management computing applications, to business process management and communication computing applications, computer networks have allowed companies today to perform processes more efficiently and optimally. A recent addition to this list of helpful tools is the business process server computing application. The business process server computing application enabled the electronic development and management of business processed within and between organizations. With the business process server computing application, information technology organizations can easily build distributed business processes that integrate applications and partners, as well as quickly establish reliable, secure trading relationships with customers and key partners using public computer networks (such as the Internet).

Currently, companies employ business process server computing applications for knowledge sharing and information communication between themselves and various partners. In this context, the business process computing application serves as a relationship management and fostering tool. As a management tool, current implementations of business process server computing applications tend to be passive in nature, often requiring expert manual oversight for updates to any configurations between the cooperating parties. The benefits realized by current implementations of business process server computing applications are astounding. Companies can share various data with their partners/client that assist with various business processes including but not limited to: transaction fulfillment, inventory management, customer relationship management, billing, and accounting.

However, there are many shortcomings with existing business process server computing applications. May of the problems arise with trading partners and are caused by a lack of both user experience and technical expertise when handling electronic data exchanges. A number of challenges are often encountered including: each cooperating party requiring significant amounts of support when testing the business process server computing application across the various cooperating parties, the deployment of new and existing technologies taking longer than anticipated, project status often not visible to the account representative during the testing process, and the support of non-cooperating parties. As more parties cooperate with a particular implementation of a business process server computing application, configuration management and configuration information deployment become tantamount to the success of the application and its general efficacy.

From the foregoing, it is appreciated that there exists a need for a system and methods that ameliorate the shortcomings of existing practices.

SUMMARY

A system and methods allowing for the deployment of configuration information associated data between cooperating parties cooperating to operate a business process server computing application are provided. In an illustrative implementation, a networked computing environment operating either within and/or between enterprises executes a business process server computing application. The business process computing application is a distributed computing application operating in whole and/or in part in one ore more cooperating computing environments. The computing application comprises a configuration management and configuration management deployment tool that operates to ensure seamless persistent configuration between the various parties cooperating to operate the business process server computing application.

In operation, the configuration management and configuration information communication/deployment tool is integrated within the cooperating parties local computing environments. Upon integration, the cooperating party selects using the configuration management and configuration information communication/deployment tool packages for local installation in the computing environment supporting the business process server computing application. Generally, these packages are associated with the specific business implementation streams needed by the cooperating party to conduct their business with other cooperating parties operating the business process server computing application.

The configuration management and configuration information communication/deployment tool allows cooperating partners to then perform a closed loop test on the local computing environment after installing the desired packages to ensure that channels and ports have been correctly configured. Furthermore, the configuration management and configuration information communication/deployment tool allows the cooperating party to run a bouncer test (e.g. a transaction simulation test) with the business process server computing application installation, passing data through the computer network environment and with other cooperating parties operating the business process server computing application and then receiving data through their local installation to verify the proper configuration.

Upon completing the tests, the cooperating party may use the configuration management and configuration information communication/deployment tool to send a request to a cooperating party to realize one or more functions offered by the business process server computing application. If the request is accepted, the function is performed. If the request is rejected, an e-mail originated by the business process server computing application is send to the requesting party providing the reason for the rejection of the request as well as providing additional configuration management information that if implemented would resolve any outstanding conflicts or problems.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF AN ILLUSTRATIVE IMPLEMENTATION

Overview

Figure 1:
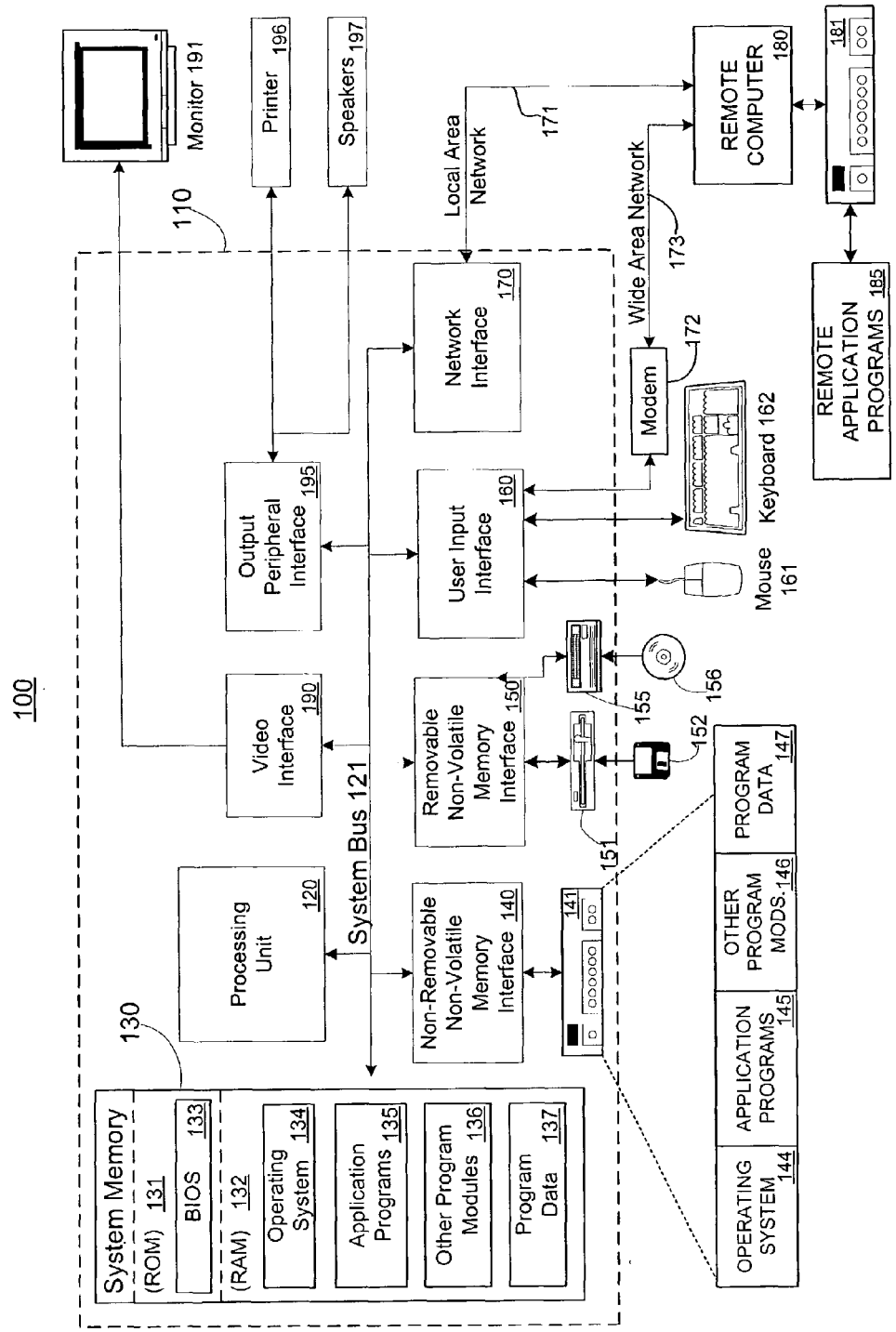
FIG. 1 is a block diagram showing an exemplary computing environment for use by the systems and methods described herein.

Business process server computing applications are a recent addition to the corporate computing landscape. With business process server computing applications, companies may leverage knowledge and communication vital transaction information with partners/clients to facilitate and foster the business relationship. For example, in the stream of commerce context, a supplier of a widget that may be used in the manufacture of wadgets may cooperate with one or more manufacturers of wadgets through a business process server computing application to facilitate the order, transaction, fulfillment, delivery, and inventory control of needed widgets. These functions which may, in the paper world, be tracked by various transaction documents such as purchase orders, invoices, delivery status reports, and inventory reports having such information are electronically managed by a business process server computing application such that the information in these reports and invoices (and the reports and invoices themselves—e.g. templates of a purchase order, invoice, delivery status report, inventory report, etc.) is electronically generated, managed, and stored by the business process server computing application.

In operation, the business process computing application acts to manage and foster relationships between cooperating parties. Specifically, the business process computing application serves as an data exchange between cooperating parties that offers various information representative of the relationship between the various cooperating parties. As an exchange, a certain amount of expertise is required to install and configure the application by the cooperating parties to reflect one or more changes of the nature, scope, and operation of these described relationships (e.g. supplier/buyer—business-to-business, supplier/buyer—business-to-consumer, etc.).

Current implementations of business process server computing applications are configuration static in that they require significant expenditure of resources in the form of labor and time to integrate one or more changes to one or more relationships between the cooperating parties operating the business process server computing application. Such expenditure can be extremely costly in the form of lost revenues to trading partners.

The present invention aims to ameliorate the shortcomings of existing implementations by offering a comprehensive configuration management and configuration information communication/deployment system and methods that cooperate with business process server computing applications to more efficiently and automatically configure and/or re-configure the business process server computing applications to be responsive to business practice changes. As such, changes in business practices can more easily and reliably be propagated and deployed between and among cooperating parties operating a business process server computing application.

It is appreciated that although a business process server computing application is described to support the inventive concepts described herein, that such computing application is merely offered for illustration purposes as the inventive concepts described herein may be applied to various computing applications operating in various computing environments including but not limited to e-commerce exchanges, data warehousing computing applications, and information technology provisioning applications.

Exemplary Computing Environment

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having access to appropriate classification data.

Figure 2:
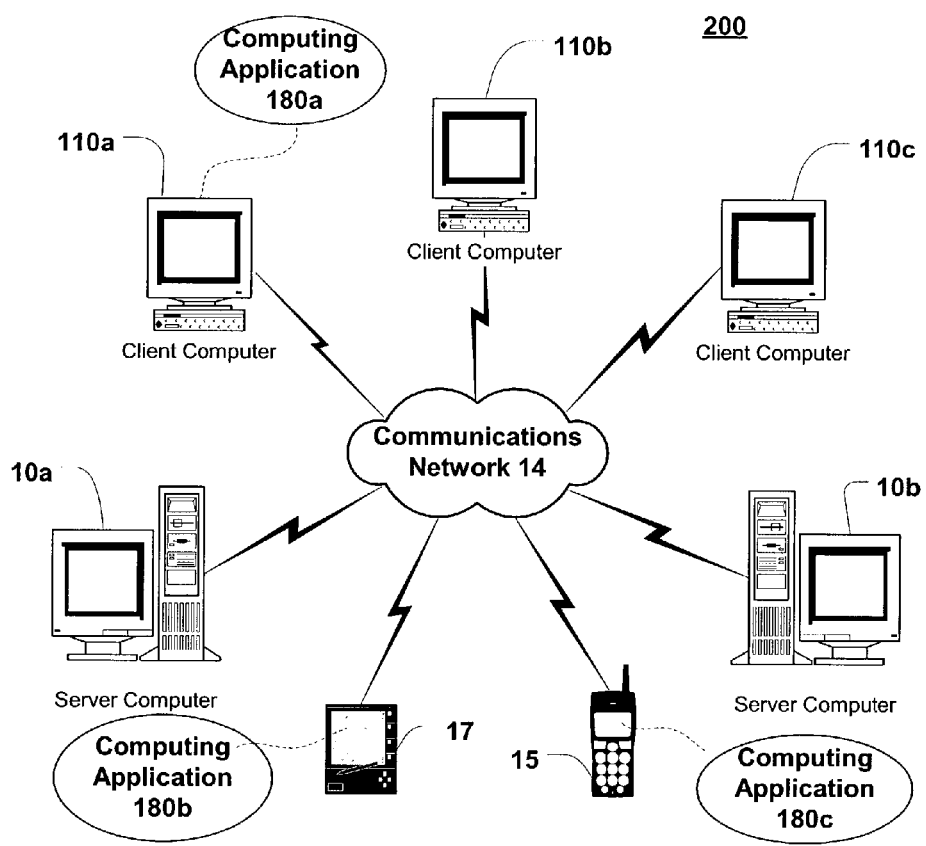
FIG. 2 is a block diagram showing an exemplary computer network environment for use by the systems and methods described herein.

FIG. 2 illustrates an exemplary network environment, with a server in communication with client computers via a network, in which the present invention may be employed. As shown, a number of servers 10a, 10b, etc., are interconnected via a communications network 14, which may be a LAN, WAN, intranet, the Internet, etc., with a number of client or remote computing devices 110a, 110b, 110c, etc., such as a portable computer, handheld computer 17, mobile telephone 15, thin client, networked appliance, or other device, such as a VCR, TV, and the like in accordance with the present invention. It is thus contemplated that the present invention may apply to any computing device in connection with which it is desirable to provide classification services for different types of content such as music, video, other audio, etc. In a network environment in which the communications network 14 is the Internet, for example, the servers 10 can be Web servers with which the clients 110a, 110b, 110c, etc. communicate via any of a number of known protocols such as hypertext transfer protocol (HTTP). Communications may be wired or wireless, where appropriate. Client devices 110 may or may not communicate via communications network 14, and may have independent communications associated therewith. For example, in the case of a TV or VCR, there may or may not be a networked aspect to the control thereof. Each client computer 110 and server computer 10 may be equipped with various application program modules 180 and with connections or access to various types of storage elements or objects, across which files may be stored or to which portion(s) of files may be downloaded or migrated. Any server 10a, 10b, etc. may be responsible for the maintenance and updating of a database (not shown) in accordance with the systems and methods described herein, such as a database (not shown) for storing classification information, music and/or software incident thereto. Thus, the present invention can be utilized in a computer network environment having client computers 110a, 110b, etc. for accessing and interacting with a communications network 14 and server computers 10a, 10b, etc. for interacting with client computers 110a, 110b, etc. and other devices 15 and 17 and databases (not shown).

Generally, communications network 14 comprises any of a wireless LAN, a fixed wire LAN, a wireless WAN, a fixed wire WAN, a wireless intranet, a fixed wire intranet, a wireless extranet, a fixed wire extranet, a wireless peer-to-peer communications network, a fixed wire peer-to-peer communications network, the wireless Internet, and the Internet.

Exemplary Distributed Computing Frameworks Or Architectures

Various distributed computing frameworks have been and are being developed in light of the convergence of personal computing and the Internet. Individuals and business users alike are provided with a seamlessly interoperable and web-enabled interface for applications and computing devices, making computing activities increasingly web browser or network-oriented.

For example, MICROSOFT®'s NET platform includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web sites, enabled by greater use of XML rather than HTML, (3) online services that feature customized access and delivery of products and services to the user from a central starting point for the management of various applications, such as e-mail, for example, or software, such as Office .NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While exemplary embodiments herein are described in connection with software residing on a computing device, one or more portions of the invention may also be implemented via an operating system, application programming interface (API) or a "middle man" object between a coprocessor and requesting object, such that services may be performed by, supported in, or accessed via all of .NET's languages and services, and in other distributed computing frameworks as well.

Efficient Information Deployment

Figure 3:
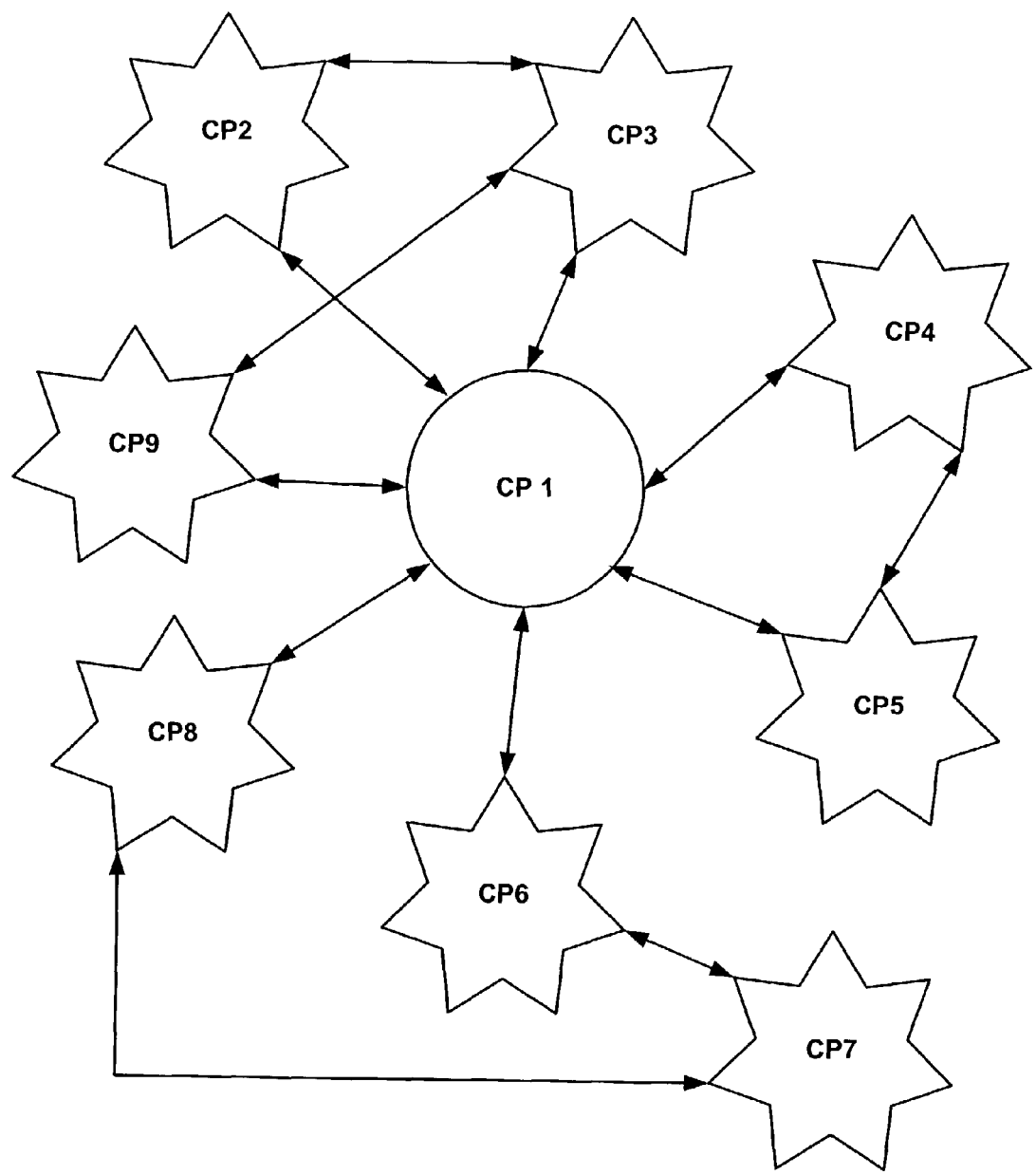
FIG. 3 is a block diagram showing the interaction of cooperating parties when operating a business process server computing application.

FIG. 3 shows a block diagram of exemplary interaction between cooperating parties who cooperate through an exemplary business process server computing application (not shown). As shown, the interaction is perceived through cooperating party 1's perspective. Cooperating party 1 CP1 may interact with one or more additional cooperating parties (CP2, CP3, CP4, CP5, CP6, CP7, CP8, and CP9) to perform one or more portions of a contemplated transaction. In addition, and as shown, the additional cooperating parties (CP2, CP3, CP4, CP5, CP6, CP7, CP8, and CP9), may cooperate independently of CP1 to perform one or more portions of a contemplated transaction. It is understood, that the configuration between the parties and the number of parties is merely exemplary as the inventive concepts described herein may be applied to various cooperating party configurations having varying numbers of cooperating parties.

In an illustrative implementation, an exemplary business process server computing application may operate among the various cooperating parties shown in FIG. 3 to facilitate one or more portions of a business process between one or more of the shown cooperating parties. For example, cooperating party 1 CP1 may be the supplier of a screw that is used in the manufacture of various products manufactured by the cooperating parties CP2, CP3, CP4, CP5, CP6, CP8, and CP9. In turn, the cooperating parties may produce products or product components that are needed by other cooperating parties independent of CP1.

For example, CP2 may manufacture a cartridge for use in a printing machine produced by CP3. The exemplary business process server computing application (not shown) may operate among the cooperating parties to facilitate one or more portions of a contemplated transaction between these cooperating parties. These portions may include but are not limited to the creation, management, and tracking of a purchase order for a screw (or a printing cartridge), the creation, management, and tracking of an invoice for shipped screws, and the creation, management, and tracking delivery reports. In the event that business process change needs to be integrated (e.g. an invoice has changed in form and substance) among cooperating parties, the business process server computing application employs a configuration management and configuration information communication/deployment (CMCICD) tool to automatically integrate the change among the operating portions of the distributed business process server computing application. Stated differently, the business process server computing application (not shown) may operate among cooperating parties as a distributed computing application such that one or more portions of the business process server computing application operates local to each of the cooperating parties.

Figure 4:
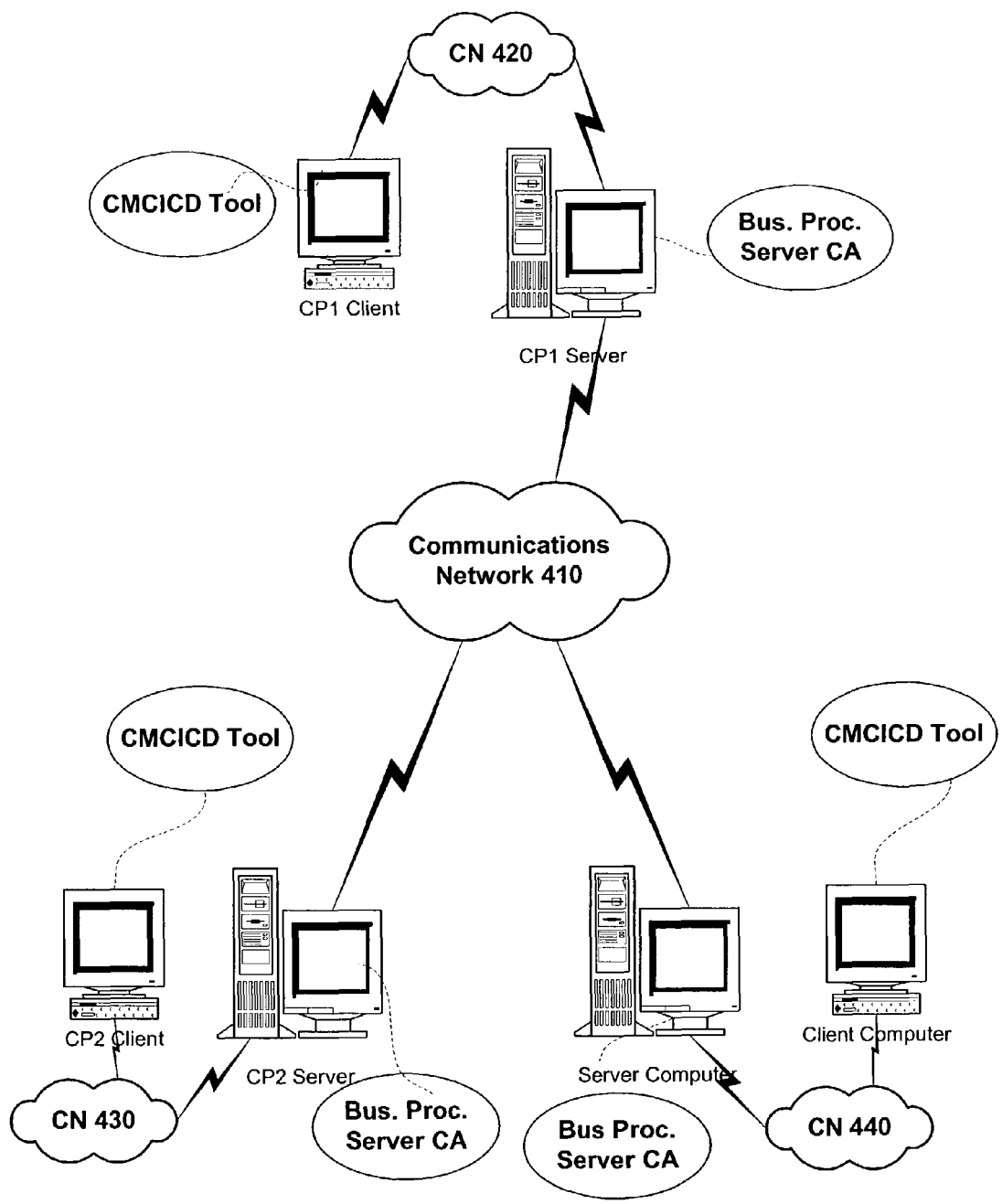
FIG. 4 is a block diagram showing the operation of a configuration management and configuration information communication and deployment system operating in a an exemplary computer environment.
Figure 5:
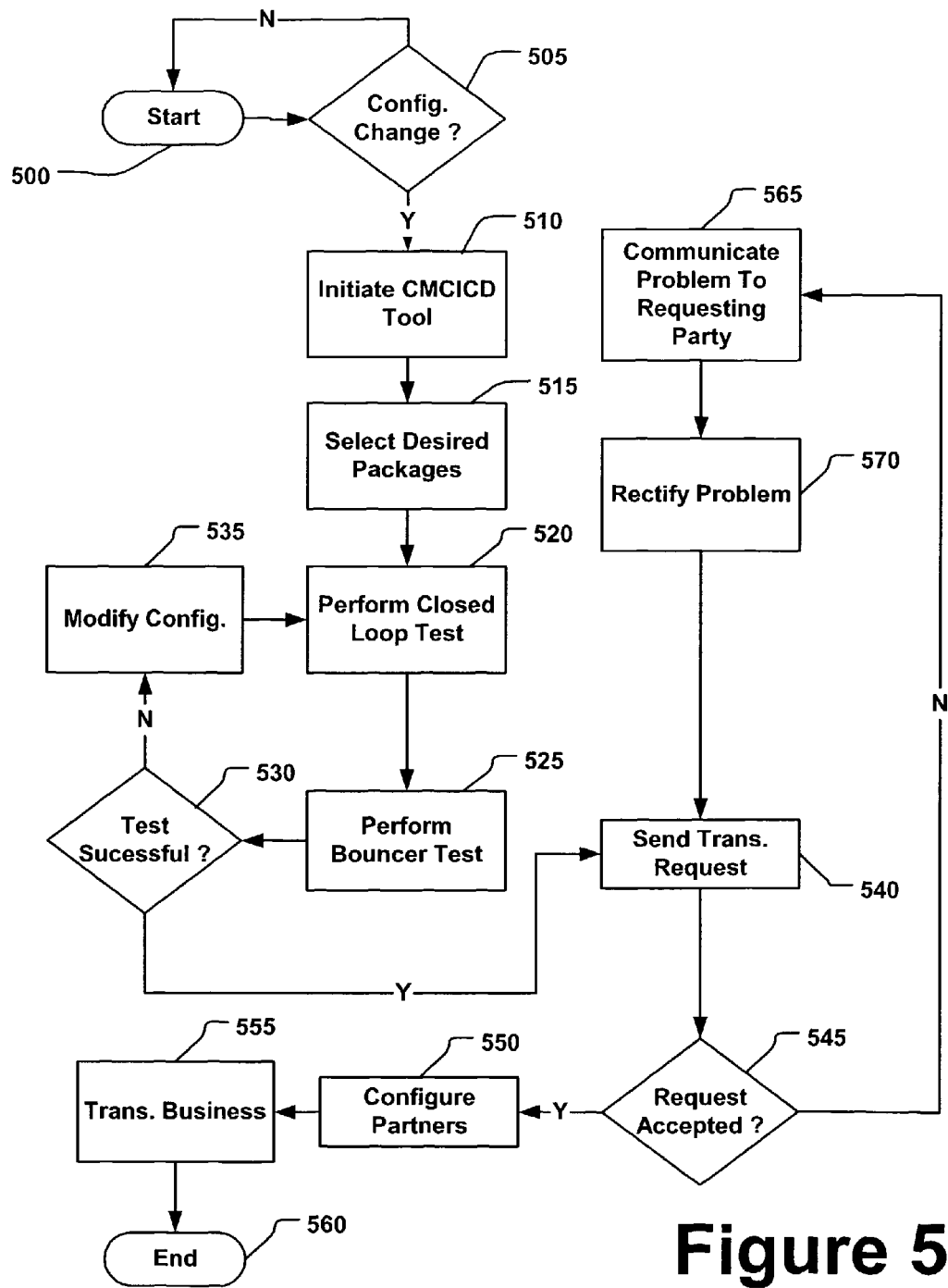
FIG. 5 is a flow diagram showing the processing performed when configuring computing environments of cooperating parties operating a business process server computing application.

FIG. 4 shows an exemplary implementation of business process server computing application operating in a distributed computing environment that employs an automated configuration management and configuration information communication/deployment tool. As shown, cooperating party 1 CP1 may operate a server computer CP1 server and client computer CP1 that communicate over communications network 420. Client computer CP1 client may support a configuration management and configuration information communication/deployment (CMCICD) tool. In addition, server computer CP1 server may operate one or more portions of a business process server computing application. Similarly, cooperating party 2 CP2 and cooperating party 3 CP3 may maintain client computer CP2 client and server computer CP2 server communicating via communications network 430, and client computer CP3 client and server computer CP3 server communicating via communications network 440, respectively. Furthermore, client computers CP2 and CP2 clients may operate the exemplary configuration management and configuration information communication/deployment (CMCICD) tool and server computers CP2 and CP3 servers may operate one or more portions of the exemplary business process server computing application. The cooperating parties may employ their respective computing environments (e.g. client computer and/or server computer) to communicate with each other using communications network 410.

In operation, the business process server computing application manages information between the cooperating parties as required and defined by the relationships that exist between these cooperating parties. The business process server computing application is generally robust easily operating in disparate computing environments having disparate communication preferences. For example, if cooperating party 1 is a supplier and cooperating party 2 is a buyer, business process server computing application may create, manage, track, and store information pertinent to the sale and/or purchase of goods between the supplier (cooperating part 1) and the buyer (cooperating party 2). The information that is created, managed, and tracked between the cooperating parties may be changed to respond to a change in business practice. For example if the seller chooses to report the sale of a good in a different way that requires a new invoice, the seller may employ the CMCICD tool (that too like the business process server computing application is robust to operate in disparate computing environments that have varying communication requirements—moreover, the CMCICD tool facilitates the operation of the business process server computing application by providing a change environment management tool) operating in his/her computing environment to propagate and deploy the change among the cooperating parties. The cooperating party initiating the change may notify the cooperating parties via the business process server computing application. Once notified, the cooperating parties may execute their CMCICD tool to select the package(s) (e.g. template information, schemas, implementation guidelines, and test data) in line with the desired change and execute the CMCICD tool to update the business process server application so that it performs the steps necessary to reflect the desired change. In the example provided, the buyer cooperating party 2 may employ the CMCICD tool operating on client computer CP2 client and cooperating with business process server computing application operating on computer server CP2 server to reconfigure the business process server computing application running on computer server CP2 to perform the functions and operations to coincide with the use of the new invoice offered by seller cooperating party 1.

Figure shows the processing performed to automatically update the configuration of one or more portions of an exemplary business process server computing application operating in a computing environment. As shown, processing begins at block 500 and proceeds to block 505 where a check is performed to determine if a configuration change is to be implemented. If there is no configuration change, processing reverts to block 500. However, if there is a configuration change, processing proceeds to block 510 where the configuration management and configuration information communication/deployment (CMCICD) tool is initiated among cooperating parties. The cooperating party implementing the change then selects the desired packages (as described above) at block 515. Once the packages are selected, they are installed in the computing environment local to the cooperating party implementing the change. A closed loop test is then performed at block 520. Subsequently, a bouncer test to ensure the proper configuration of computing hardware is performed at block 525. A check is then made at block 530 by the exemplary business process server computing application to make sure that the test was successful. If the installation of the package (s) and the tests are not successful, processing proceeds to block 535 where the configuration is modified. From there processing reverts to block 520 and proceeds there from.

However, if at block 530 it is determined that the tests are successful, processing proceeds to block 540 where a transaction request is sent by the business process server computing application operating in the computing environment of the cooperating party implementing the change. A check is then performed at block 545 to determine if the request is accepted by other cooperating parties operating the business process server computing application. If the request has been accepted, processing proceeds to block 550 where the cooperating parties are configured according to the desired change. Transactions having the desired change may then be processed at block 555. From there processing terminates at block 560.

However, if at block 545 it is determined that the transaction request has not been accepted, processing proceeds to block 565 where the requesting party is notified (e.g. via e-mail) of the problem or problems in the request and suggests solutions to the problems. The suggested solutions may be created by the exemplary business process server computing application. The problem or problems are rectified at block 570 according to one or more of the suggestions and processing then reverts to block 540.

As mentioned above, while illustrative implementations of the systems and methods described herein have been described in connection with various computing devices and network architectures, the underlying concepts may be applied to any computing device or system in which it is desirable to perform and execute debugger causality. Thus, the techniques for debugger causality in accordance with the systems and methods described herein may be applied to a variety of applications and devices. While exemplary programming languages, names and examples are chosen herein as representative of various choices, these languages, names and examples are not intended to be limiting.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the web page content protection aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the content protection capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the illustrative implementations of the various figures, it is to be understood that other similar implementations may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the systems and methods described herein may be implemented in or across a plurality of processing chips or devices, and storage may similarly be effected across a plurality of devices. Therefore, the systems and methods described herein should not be limited to any single implementation, but rather should be construed in breadth and scope in accordance with the appended claims.

What is claimed is:

1. A distributed computing system comprising:
   a first computing environment associated with a first cooperating party, the first computing environment comprising a first computer and a second computer;
   a second computing environment associated with a second cooperating party, the second computing environment comprising a first computer and a second computer;
   the first computing environment configured to:
      operate, at least in part, via the first computer of the first computing environment, a first portion of a plurality of portions of a distributed business process server computing application; and
      operate, via the second computer of the first computing environment, a first configuration information management and deployment tool configured to automatically configure said first portion of the distributed business process server computing application in response to a desired change of a business process associated with the distributed business process server computing application initiated by the first cooperating party; and
   the second computing environment configured to:
      operate, via the first computer of the second computing environment, a second portion of the distributed business process server computing application and;
      operate, via the second computer of the second computing environment, a second configuration information management and deployment tool configured to automatically configure the second portion of the distributed business process server computing application in response to a request from the distributed business process server computing application of the first computing environment, wherein the request is indicative of the desired change of the business process initiated by the first cooperating party, wherein each of the first and second cooperating parties interacts directly with other cooperating parties and is configured to automatically and successfully test the desired change of the business process locally before communicating the request to the second cooperating party to either reject or accept and automatically configure the desired change of the business process and wherein the second cooperating party implements the desired changed at the first computer of the second computing environment when the request is accepted, and the second cooperating party does not implement the desired change when the request is rejected.

2. The distributed computing system as recited in claim 1, wherein said distributed business process server computing application operates in a distributed computing environment.

3. The distributed computing system as recited in claim 2, wherein said distributed computing environment comprises computer networks having client computers and server computers cooperating through a communication network.

4. The distributed computing system as recited in claim 3, wherein said first configuration information management and deployment tool operates on a server that executes said first portion of the business process server computing application.

5. The distributed computing system as recited in claim 4, wherein said first configuration information management and deployment tool is a computing application.

6. The distributed computing system as recited in claim 3, wherein said communications network comprises any of a local area network, a wireless local area network, a wide area network, a wireless wide area network, an intranet, a wireless intranet, an extranet, a wireless extranet, a peer-to-peer network, a wireless peer-to-peer network, and the Internet.

7. The distributed computing system as recited in claim 1, wherein said change of the business process arises from a change in one or more business practices between the first and second cooperating parties.

8. The distributed computing system as recited in claim 7, further comprising a service bureau overseeing the operation of said business process server computing application among said first and second cooperating parties.

9. The distributed computing system as recited in claim 7, wherein said first and second cooperating parties are commerce partners cooperating to provide at least one of products and services to each other.

10. The distributed computing system as recited in claim 9, wherein said business process comprises data representative of the at least one of products and services.

* * * * *